United States Patent
Li et al.

(10) Patent No.: US 12,182,307 B1
(45) Date of Patent: Dec. 31, 2024

(54) SYSTEM AND METHOD FOR ACTIVE LEARNING TO DETECT PERSONALLY IDENTIFYING INFORMATION

(71) Applicant: PRIVACY ANALYTICS INC., Ottawa (CA)

(72) Inventors: Muqun Li, Nashville, TN (US); Hazel Joyce Nicholls, Ottawa (CA); Martin Scaiano, Ottawa (CA)

(73) Assignee: Privacy Analytics Inc., Ontario (CA)

( * ) Notice: Subject to any disclaimer, the term of this patent is extended or adjusted under 35 U.S.C. 154(b) by 645 days.

(21) Appl. No.: 16/129,032

(22) Filed: Sep. 12, 2018

Related U.S. Application Data (60) Provisional application No. 62/557,851, filed on Sep. 13, 2017.

(51) Int. Cl.
  *G06N 20/00* (2019.01)
  *G06F 16/33* (2019.01)
  (Continued)

(52) U.S. Cl.
  CPC .......... *G06F 21/6254* (2013.01); *G06F 16/33* (2019.01); *G06F 16/93* (2019.01);
  (Continued)

(58) Field of Classification Search
  CPC .... G06F 21/6254; G06F 40/169; G06F 16/93; G06F 16/33; G06F 18/2155; G06N 20/00; G06K 9/6259
  (Continued)

(56) References Cited

U.S. PATENT DOCUMENTS 8,635,172 B1 * 1/2014 Buryak ................ G06K 9/6262
  706/12
9,785,634 B2 * 10/2017 Puzicha ............... G06Q 10/103
(Continued)

OTHER PUBLICATIONS

Foody, Giles M., et al. "The sensitivity of mapping methods to reference data quality: Training supervised image classifications with imperfect reference data." ISPRS International Journal of Geo-Information 5.11 (2016): 199 (Year: 2016).*
(Continued)

*Primary Examiner* — Andrew T McIntosh
(74) *Attorney, Agent, or Firm* — ALG Intellectual Property, LLC (57) ABSTRACT

Using active learning to detect Protected Health Information ("PHI") in documents stored as unannotated natural language data by selecting an initial chunk of text from the documents; forming a gold standard data via annotating the text by a human, the annotating identifies and tags PHI required to de-identify the text; training, using machine learning and the text before and after the annotating, a model having rules for PHI detection; querying, using a strategy, the documents to select a next chunk of text; machine annotating the text using the trained model; updating the gold standard data via correcting the machine annotation of the text by the human, wherein an amount of corrections in the updated gold standard data indicates a quality of the machine annotation; and iterating the steps starting at training, until the quality of the machine annotation is higher than a predetermined quality threshold.

23 Claims, 3 Drawing Sheets

(51) Int. Cl.
   *G06F 16/93*    (2019.01)
   *G06F 18/214*   (2023.01)
   *G06F 21/62*    (2013.01)
   *G06F 40/169*   (2020.01)

(52) U.S. Cl.
   CPC ........ *G06F 18/2155* (2023.01); *G06F 40/169* (2020.01); *G06N 20/00* (2019.01)

(58) Field of Classification Search
   USPC .......................................................... 706/12
   See application file for complete search history.

(56) References Cited

U.S. PATENT DOCUMENTS

| | | | | |
|---|---|---|---|---|
| 9,875,301 | B2* | 1/2018 | Hua | G06N 20/00 |
| 9,928,278 | B2* | 3/2018 | Welinder | G06F 16/14 |
| 9,990,515 | B2* | 6/2018 | Baker | G06F 16/285 |
| 10,062,039 | B1* | 8/2018 | Lockett | G06N 3/0445 |
| 10,140,421 | B1* | 11/2018 | Bernard | G06N 3/04 |
| 10,169,315 | B1* | 1/2019 | Heckel | G06N 3/0454 |
| 10,222,942 | B1* | 3/2019 | Zeiler | G06N 5/022 |
| 10,685,293 | B1* | 6/2020 | Heimann | H04L 63/1433 |
| 10,705,796 | B1* | 7/2020 | Doyle | G06N 5/003 |
| 10,803,201 | B1* | 10/2020 | Nicholls | G06F 21/6254 |
| 2006/0047617 | A1* | 3/2006 | Bacioiu | G06N 3/08 |
| | | | | 717/124 |
| 2008/0109454 | A1* | 5/2008 | Willse | G06F 16/313 |
| | | | | 707/E17.084 |
| 2009/0216696 | A1* | 8/2009 | Downs | G06F 16/355 |
| | | | | 706/20 |
| 2010/0153318 | A1* | 6/2010 | Branavan | G06F 16/35 |
| | | | | 706/12 |
| 2010/0285441 | A1* | 11/2010 | Hefferman | G09B 7/02 |
| | | | | 434/350 |
| 2010/0322489 | A1* | 12/2010 | Tizhoosh | G06K 9/6253 |
| | | | | 382/128 |
| 2010/0332423 | A1* | 12/2010 | Kapoor | G06N 5/045 |
| | | | | 706/12 |
| 2012/0254333 | A1* | 10/2012 | Chandramouli | G06F 40/10 |
| | | | | 709/206 |
| 2014/0122381 | A1* | 5/2014 | Nowozin | G06N 20/00 |
| | | | | 706/12 |
| 2014/0279761 | A1* | 9/2014 | Aliferis | G06N 20/00 |
| | | | | 706/12 |
| 2016/0148077 | A1* | 5/2016 | Cox | G06K 9/627 |
| | | | | 382/159 |
| 2016/0235324 | A1* | 8/2016 | Mershin | A61B 5/6803 |
| 2017/0031904 | A1* | 2/2017 | Legrand | G06F 16/904 |
| 2017/0212921 | A1* | 7/2017 | Wu | G06N 7/005 |
| 2017/0243028 | A1* | 8/2017 | LaFever | G06F 21/6263 |
| 2018/0068222 | A1* | 3/2018 | Brennan | G06N 5/022 |
| 2018/0075344 | A1* | 3/2018 | Ma | G11C 13/0002 |
| 2018/0075368 | A1* | 3/2018 | Brennan | G06N 20/00 |
| 2018/0082194 | A1* | 3/2018 | Lozano | G06F 16/285 |
| 2018/0336370 | A1* | 11/2018 | Schonwald | G06F 21/6254 |
| 2018/0373980 | A1* | 12/2018 | Huval | G06K 9/6254 |
| 2019/0019061 | A1* | 1/2019 | Trenholm | G06K 9/6259 |
| 2019/0034822 | A1* | 1/2019 | Farré Guiu | G06K 9/6259 |
| 2019/0080354 | A1* | 3/2019 | Booker | G06Q 50/01 |
| 2019/0104124 | A1* | 4/2019 | Buford | H04L 63/10 |
| 2019/0213354 | A1* | 7/2019 | Bhowan | G06F 40/30 |
| 2019/0295126 | A1* | 9/2019 | Madden | G06Q 30/0256 |
| 2020/0202171 | A1* | 6/2020 | Hughes | G06K 9/6264 |
| 2021/0042630 | A1* | 2/2021 | Roberts | G06F 21/6245 |

OTHER PUBLICATIONS

Lin, Frank, and William W. Cohen. "Semi-supervised classification of network data using very few labels." 2010 international conference on advances in social networks analysis and mining. IEEE, 2010 (Year: 2010).*

A. Fong, J. L. Howe, K. T. Adams and R. M. Ratwani, "Using active learning to identify health information technology related patient safety events," Applied clinical informatics, vol. 8, No. 1, pp. 35-46 (12 pages), 2017.

Y. Chen, T. A. Lasko, Q. Mei, J. C. Denny and H. Xu, "A study of active learning methods for named entity recognition in clinical text," Journal of biomedical informatics, vol. 58, pp. 11-18 (8 pages), 2015.

Bostrom, Henrik and H. Dalianis. "De-identifying health records by means of active learning." ICML 2012 (2012). (4 pages total).

* cited by examiner

SYSTEM AND METHOD FOR ACTIVE LEARNING TO DETECT PERSONALLY IDENTIFYING INFORMATION

CROSS-REFERENCE TO RELATED APPLICATION

This application claims the benefit of U.S. Provisional Application Ser. No. 62/557,851, filed on Sep. 13, 2017, the entire content of which is hereby incorporated by reference in its entirety.

FIELD OF INVENTION

The inventive system relates to detection and removal of personal identification information from public view and in particular an iterative active learning system to mask or remove personal identification information.

DESCRIPTION OF RELATED ART

Personal information of individuals is continuously captured by a multitude of computer applications, which amass and share such information. Moreover, personal information including intimate details about health, finances and buying habits of vast numbers of people, tens and hundreds of millions of people, is stored and managed by public and private sector organizations. These personal information details may be used to provide valuable research, epidemiologic and business insight. For example, personal information collected from a chain drugstore's prescriptions, may be used to indicate an occurrence and location of a flu outbreak.

To extract or maximize the value of the personal information, which is commonly maintained in databases, outside or third party organizations are allowed access, usually for a fee. To protect the privacy of individuals, before being released to third-parties, the collected personal information is usually "de-identified" or "anonymized". An important type of de-identification ensures that the personal information is unlikely to be traced to the person to whom it pertains. This protects against "identity disclosure".

When de-identifying personal information, only removing direct identifiers, such as names and addresses, is not sufficient to protect the privacy of the persons whose personal information is being released. The problem of de-identification involves personal information details that are not obviously identifying. These personal information details, known as quasi-identifiers, include, e.g., the person's age, sex, postal code, profession, ethnic origin and income, financial transactions, medical procedures, and so forth.

De-identification of the personal information requires an assessment of the risk of re-identification. Accordingly, systems and methods that enable improved risk assessment remains highly desirable.

SUMMARY OF THE INVENTION

The system in accordance with the present invention selects a chunk of data or text, e.g., a passage, a page, a paragraph, etc., from a multi-page document and submits it to a human source to annotate. This annotation identifies Protected Health Information ("PHI") within the selected chunk of data. At least one computing device, using machine learning techniques, is then used to learn what annotations have been made by the human source and formulate rules for PHI identification in accordance with which the annotations were made.

Then, a next chunk of data is selected and is annotated by the at least one computing device using the formulated rules for PHI identification. Thus machine annotated next chunk of data is then reviewed, corrected and, if necessary, further annotated by the human source. The at least one computing device, using the machine learning techniques, reviews the corrections and further annotations made by the human source and updates the formulated rules for PHI identification to reflect the corrections made by the human source.

The system then repeats the steps of selecting and annotating further chunks of data using the updated formulated rules for PHI identification until optimal performance is reached. The optimal performance may be judged by a predetermined level of quality, which may be measured by, e.g., a number of annotations made by the human source per selected chunk of data. A level of quality can also be measured at least in part by, e.g., a complete annotation of PHI.

Importantly, the selection of the next chunks of data is performed strategically to optimize machine learning, i.e., learn as much as possible, as quickly as possible, so as to minimize involvement by human sources. The selection of optimized chunks of data provides a greater amount of information to be learned through the machine learning. Thus, the system can learn the annotation rules for PHI identification in less time, requiring fewer corrections by the human source. Also, by facilitating the selection of the next chunks and machine learning of the rules for PHI identification, the authoritative human source needs to make fewer corrective annotations on each iteration of machine learning and require fewer iterations to train the machine learning system.

In addition, the system can label all unlabeled chunks of data and selects the chunks of data having the greatest measure of uncertainty. Where uncertainty is a measure of confidence, in a statistical sense, of the chosen labels.

Accordingly, what is provided is a system and method for de-identifying documents, using active learning to detect Protected Health Information ("PHI") in one or more documents stored as unannotated natural language data by reading the unannotated natural language data, selecting an initial chunk of data having text, from the one or more documents; forming a gold standard data via annotating the text by a human source, the annotating identifies and tags PHI required to de-identify the text; training, using machine learning and the text before and after the annotating, a de-identification model having rules for PHI detection; querying, using a strategy, the one or more documents to select a next chunk of data having the text; machine annotating the text using the trained de-identification model; updating the gold standard data via correcting the machine annotation of the text by the human source, wherein an amount of corrections in the updated gold standard data indicates a quality of the machine annotation; and iterating the steps of training, querying, machine annotating, and updating, until the quality of the machine annotation is higher than a predetermined quality threshold. And, further, machine annotating the unannotated natural language data in accordance with the trained de-identification model when the quality of the machine annotation is higher than the predetermined quality threshold.

BRIEF DESCRIPTION OF THE DRAWINGS

The above and still further features and advantages of the system of the present invention will become apparent upon consideration of the following detailed description thereof, especially when taken in conjunction with the accompanying drawings wherein like reference numerals in the various figures are utilized to designate like components, and wherein.

DETAILED DESCRIPTION OF THE INVENTION

Strong detection of Protected Health Information (PHI) helps ensure accurate re-identification risk measurement and promotes greater data utility in the de-identified free form text. The detection can be improved by machine learning, however, access to training data is often an issue:
- services delivery teams may have access to the PHI contained only within a de-identification project for the purposes of de-identifying that data set;
- but retention of client data and original PHI for the purposes of machine learning is more often than not, prohibited by law.

The system of the present invention addresses this problem by optimizing selection of a sample or chunk of data or text of the documents, i.e., a multi-page free-form text, being de-identified such that a human source or active learning approach converges quickly and eliminates the need to build or retain a large training set. The system provides better detection, faster turnaround time, and a reduced need for expertise in Natural Language Processing (NLP) detection techniques for those operationalizing de-identification of unstructured text.

Currently, using a fully automated de-identification technique to de-identify, e.g., clinical trials documents, requires a significant investment of time in processing of each document to reach a high accuracy, taking weeks of effort. Similarly, using a purely manual de-identification technique takes weeks and even months of effort. Alternatively, a hybrid de-identification technique introduced by the system of the present invention, includes an initial automated detection, which quickly covers 80% or more of the PHI, followed by a secondary, manual pass that corrects all the missed or incorrectly labeled PHI.

For an average 4,000 page document, the automated de-identification takes between one and three days. The manual de-identification will similarly take between one and three days. Once the automated and/or manual de-identification is done, there is no more room for tuning or improvement even if simple mistakes in the process are identified. Contrarily, the hybrid de-identification of the system of the present invention reduces the amount of expert knowledge needed for tuning the system. All that is required to tune, i.e., improve, the hybrid de-identification is a human source who can accurately annotate text. Each iteration of annotation, improves the results and reduces the effort required of the human source.

Further, the automated and manual de-identification approaches have to correct a mistake that is repeated many times throughout the document. Contrarily, the hybrid de-identification of the system of the present invention learns not to make the same mistakes. This advancement means the system can now learn and adapt its detection with far fewer corrections to be made by human sources, thereby reducing the need for technical expertise which lowers costs and increase turnaround on of de-identification projects. Furthermore, the hybrid de-identification solution introduced by the system of the present invention provides confidence monitoring, which predicts when additional annotation is required.

Embodiments in accordance with the system of the present invention reduce a need for involvement by an authoritative outside source (e.g., a human) to tune and optimize the detection rules for PHI identification; reduce an amount of data required to train a machine learning system, because an amount of training data needed to achieve results meeting a predetermined level of quality is reduced; and reduce an amount of effort required by the authoritative outside source to obtain a highly accurate annotation of PHI, because the system learns from its mistakes. The system may learn enough such that the authoritative outside source reviews the machine-produced annotations without needing to change the information or provide additional annotations. This facilitates recognition of whether the results lack sufficient statistical confidence in the detection of PHI, and can indicate that additional tuning/training data is required.

Embodiments in accordance with the present system use active learning for PHI detection within natural language data, in order to improve upon the manual processes and other processes of the background art. In contrast, for the background art, achieving nearly 100% recall with either a completely automatic process or a completely manual process is too costly in terms of time and effort. Some methods of the background art for detection of PHI require human effort for at least two reasons: 1) in order to tune an automatic system before PHI detection by using expert knowledge; and 2) in order to manually correct the results after the automatic detection.

An important consideration is how to achieve a preferred balance between tuning detection rules for PHI identification with expert knowledge, and correction of results by an authoritative human source after processing by an automated detection process. In the background art, by the time a tuning of the system is completed, the balance already has been struck and cannot be improved or updated afterwards, which means: 1) if the tuning is not sufficient, the system could miss easy-to-catch PHI and lead to extra cost of manual correction effort; and 2) if too much effort is given to the tuning process, the system could be over-tuned to catch an infrequent pattern of PHI which is far from ideal. In contrast, the system in accordance with the present invention incorporate active learning in the process because a byproduct of the active learning is achieving dynamically an improved balance of tuning rule definition and correction of results, by improving the detection of unprocessed text based upon already-annotated text.

Corrections from an authoritative human source (e.g., a human), allow a machine learning-based system to request feedback from the authoritative human source. For PHI detection, the feedback may be in the form of asking the authoritative human source how to classify difficult annotations, or by providing the authoritative human source with a new subset of documents to annotate/correct. With each feedback and correction from the authoritative human source, the inventive system learns to correct mistakes, and update a PHI de-identification model or set of rules for future PHI de-identification, causing a next iteration of detection to be more accurate by incorporating lessons learned from the previous iteration. Ideally, over time the authoritative human source may need to make fewer corrections, and merely reviews the correctness of the automated results. The inventive system discloses a process to provide active learning for PHI detection. The process may include the following steps:

Step 1. Start with an entire set of unannotated natural language text. Initially, a small chunk of data or text is sampled and annotated by an authoritative human source as a starting point of the active learning process, in order to create a "gold standard" dataset (i.e., a dataset considered to be as correct as possible) for machine learning-based PHI de-identification model training.

Step 2. Next is the query phase, during which the active learning framework automatic ally selects the next chunk of data to be corrected by the authoritative human source and added to the next iteration of PHI de-identification model creation.

Step 3. The learning and PHI de-identification model-refining process continues until the PHI de-identification model has met a predetermined level of performance or quality of PHI detection. For example, performance or quality may be measured by an amount of additional annotations or corrections are done by the authoritative human source.

A key factor in determining the active learning performance is the query strategy, which is a criterion utilized to select the next chunk of data for an authoritative human source to annotate and/or to correct. Generally there are several criteria that could be taken into account for query:

First, informativeness of the data may be used. The inventive system attempts to query the most informative data. In practice, the querying usually is done by uncertainty sampling, which leads to a question of how to measure uncertainty. Measures of uncertainty may include statistical confidence scores of PHI detection, entropy, and variants of these measures. A selection approach of query-by-committee (QBC) can be used, in which a collection of PHI de-identification models is trained with the same dataset, and the dataset that causes the most disagreement from the PHI de-identification models is selected as the most informative.

Second, representativeness of the data may be used. An active learning process may select samples that are deemed to represent a distribution of the entire dataset, which involves computing similarity between samples and weighting samples based on similarity.

Third, diversity of the data may be used. For example, in PHI detection, for the sake of efficiency batch-mode active learning may be adopted, which allows to query a set of samples at a time, rather than query one by one. A straight-forward approach is to select the "N" most informative and/or representative samples in each round. However, a challenge exists because there is no guarantee the selected samples are diverse enough to create a good enough PHI de-identification model. Also measures to evaluate diversity may be incorporated.

Fourth, a cost model may be used that factors in the impact of leaks on re-identification risk measurement.

Figure 1:
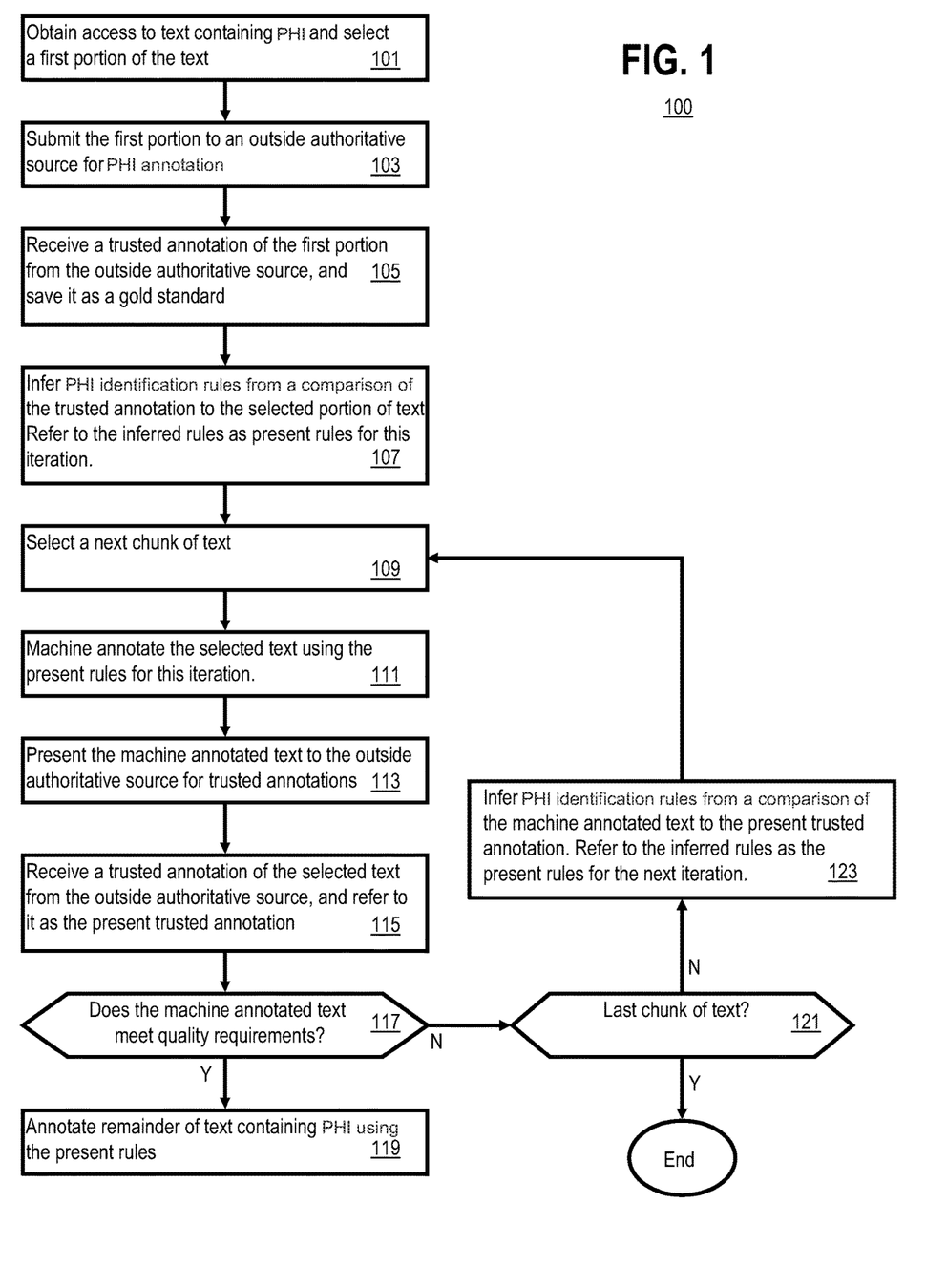
FIG. 1 is a flowchart of a process for active learning to determine Personally Identifiable Information from chunks of data or text from a multi-page document, in accordance with a preferred embodiment of the present invention.

FIG. 1 shows process 100. At step 101, process 100 accesses one or more data documents having text that includes PHI, and selects a first chunk of the data or text. For example, the first chunk of data may represent an amount of text consistent with a structure of the text, e.g., a literary block such as a paragraph, a page, a chapter, etc. Alternatively, the first chunk of data may represent a fixed amount of text, e.g., 10 Kbytes, 100 Kbytes, etc. The first chink of data may also represent a distinct type of text, e.g., a free-form narrative, rather than tabular data, or represent a distinct source of text, e.g., a government data source, rather than social media data, and so forth.

At step 103, the selected first chunk of data is passed to an authoritative human source (e.g., a human, a separate fully-trained PHI detection system, etc.), who will analyze the first chunk of data searching for PHI, and annotate the text accordingly.

At step 105 the annotation from the authoritative human source is received and saved. The annotation, if trusted, may be considered to be a gold standard, i.e., as correct as feasibly possible, e.g., as compared to a pre-determined threshold of correctness such as 99% correct.

At step 107, rules for PHI identification are inferred from a comparison of the trusted annotation to the text in the first chunk of data selected from step 101. The inferred rules for PHI identification will be referred to as present rules for this iteration.

At step 109, a next chunk of text having PHI is selected. The next chunk of text may be, e.g., a next paragraph, a next page, a next chapter, a next 10 Kbytes of text, and so forth. In some embodiments, the next chunk of text may be selected such that training opportunities are improved. For example, the next chunk of text may include differences from the first chunk of text in order to present different scenarios for the detection of PHI (e.g., tabular text rather than narrative text, or social media source rather than government data source, etc.). In some embodiments, the next chunk of text may share some characteristics with a previous chunk of text, in order to make sure that rules for PHI identification were correctly inferred from the annotation by the authoritative human source.

At step 111, the next chunk of text selected in step 109 is annotated using the present rules for this iteration.

At step 113, the machine annotated next chunk of text is submitted to the authoritative human source for corrective annotations.

At step 115 a trusted annotation of the next chunk of text is received from the authoritative human source. The received trusted annotation is referred to as present trusted annotation.

At step 117, it is determined if the machine annotated text meets quality requirements. If the quality requirements are met, at step 119, the present rules are deemed to be adequate, and the remainder of the one or more data documents are annotated using the present rules.

Some embodiments of the inventive system, may continue to monitor the quality requirements as the present rules are applied in step 119, and if the quality drops below a predetermined threshold quality level, then the remainder of the one or more data documents may be resubmitted to the authoritative human source for additional training such that the control of process 100 reverts to step 123. The additional training may be necessary if the nature or characteristic of the presently-processed text has changed from the nature or characteristic of the text used for training, e.g., if statistical measures of the text are not ergodic. Statistical measures of the text may be usable to distinguish between different kinds of text. For example, text as tables may have more whitespace, more tabs, more linefeeds, and more digits compared to text as narrative sentences and paragraphs.

The quality is judged with respect to the received trusted annotation of step 115. If the trusted annotation represents a corrective annotation of the machine annotated text, then quality may be judged by a number of corrections that were made, with fewer corrections representing higher quality. If the received trusted annotation represents a de novo annotation of the next chunk of text selected at step 109, then quality may be judged by how well the machine annotated text matches the trusted annotation.

Errors or mismatches may be weighted according to a severity or degree of revealing PHI. In such embodiments, quality may be judged by a weighted count or summation of differences between the machine annotated text and the text as annotated (or correctively annotated) by the authoritative human source.

Returning to the discussion of process 100, the steps discussed above, followed each other sequentially, starting at step 101 to step 119, as illustrated in FIG. 1. However, if at step 117 the quality requirements are not met, then, at step 121, it is determined whether a last chunk of text in the one or more data documents has been reached. If the end of file in the one or more data documents is reached process 100 terminates.

In some embodiments, the order of steps 117 and 121 may be reversed.

However, if the end of file in the one or more data documents is not reached, at step 123, updated rules for PHI identification may be inferred from a comparison of the machine annotated text to the present trusted annotation, or from the corrections in the present trusted annotations, as appropriate. The updated inferred rules for PHI identification may be referred to as the present rules for the next iteration. Upon completion of step 123, process 100 may revert to step 109.

Figure 2:
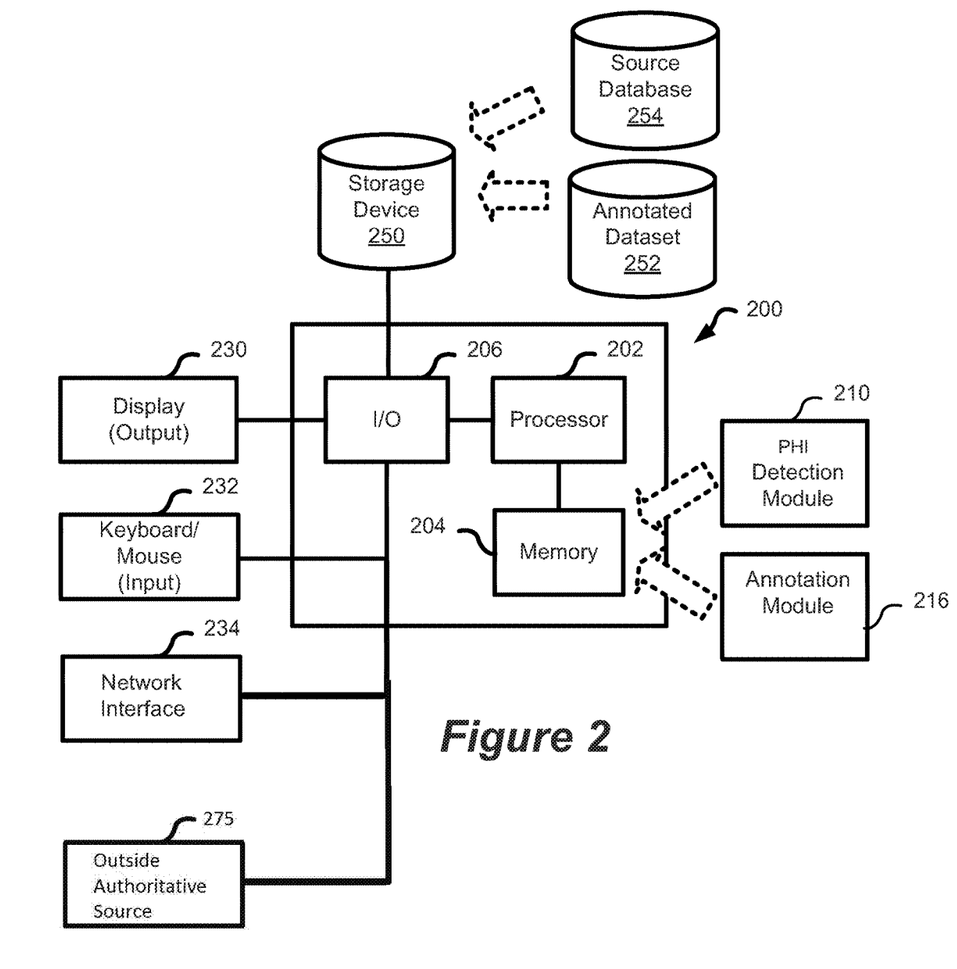
FIG. 2 is a diagram of a representative system in accordance with a preferred embodiment of the present invention for determining re-identification risk in at least one multi-page document.

Process 100 may be executed on a system illustrated in FIG. 2. FIG. 2 shows system 200 which includes a computing device including processor 202 connected to memory 204, and input/output interface 206. Memory 204 may store computer program instructions of a module that learns or infers rules from annotations provided by an authoritative human source, a module that detects PHI in the text of the one or more documents, e.g., module 210, using rules for PHI identification, and annotates the one or more documents or a dataset based upon the detected PHI, e.g., module 216.

Input/output interface 206 further connects processor 202 to storage device 250, which may be connected directly or via a network, e.g., the Internet. As illustrated, annotated dataset 252 and source database 254 from which the dataset is derived may be standalone storage devices or reside on storage device 250. Optionally, display device 230 that allows access to data and control or monitor progress of any executing processes; input devices 232, such as keyboard and/or mouse to provide input; a network interface 234; and a communication interface for providing access to an authoritative human source 275 are connected via input/output interface 206 to processor 202.

Additionally, system 200 may include a computer readable memory may be external or internal to the system 200 and provided by any type of memory such as read-only memory (ROM) or random access memory (RAM). Computer instructions, discussed above with reference to FIG. 1 may be provided on any type of computer readable medium. System 200 is capable of reading computer readable medium on which the computer instructions are provided.

Use Cases

An exemplary description of how a presentation of information may change over time may be described with respect to privacy guidelines in Europe for sensitive PHI medical information, which are set forth in the "European Medicines Agency policy on the publication of clinical data for medicinal products for human use" (hereafter, "Policy 0070"), developed by the European Medicines Agency ("EMA"), in accordance with Article 80 of Regulation (EC) No 726/2004. Policy 0070 was adopted by the EMA Management Board on 2 Oct. 2014. Policy 0070 includes two phases: Phase 1 pertains only to publication of clinical reports; and Phase 2 pertains to the publishing of individual patient data (IPD). Clinical reports and IPD collectively may be referred to as "clinical data" within Policy 0070.

First Use Case

A first use case pertains to processing a single Policy 0070 submission or clinical report. It may be desirable to have documents completely reviewed by human sources. However, the human sources' time is expensive and it should be minimized. To these objectives, a submission may be processed in small parts, with each part being coherent and intelligible to the human source reading that part. Steps of such a process may include:

First, annotating by the human source the PHI. The human source's annotation is likely to be imperfect, and include missed PHI.

Second, an automated system learns from comparing the human source's annotations to previous automated corrections of the same data, and updates its correction rules (including neural network if used) appropriately.

Third, the automated system annotates new data more correctly using the updated correction.

Fourth, the automated system selects parts of the data that have greatest uncertainty and which have not yet corrected by the human source. Steps two through four may be repeated for each part until all of the data is processed.

With each iteration, the automated system catches more PHI and makes fewer errors, thus less correction by the human source is required. Ideally, the automated system converges to essentially the same outcome or result as what the human source would produce, thus allowing the human source to merely read and review the results of the automated system, rather than correct the results. This will save time, because correcting is time-consuming and reading is faster. The more quickly convergence occurs, the lower will be the costs of processing of the clinical report document.

Second Use Case

In a second use case, an automated system for de-identification is to be tuned and evaluated so that a risk of re-identification measurement can confirm that the risk is below a predetermined threshold. The second use case includes both a tuning phase and an automated processing phase. The tuning phase of the second use case may proceed using the following process:

Initially, a corpus to be de-identified already may have been divided into a plurality of parts. The process begins, first, with annotating PHI that has been discovered in the first part. The human source's annotation is likely to be imperfect, and include missed PHI.

Second, the automated system (specifically, the process executing on the automated system) learns from previously corrected data.

Third, the automated system annotates new data more correctly, by usage of lessons learned in the second step from previous corrections.

Fourth, the automated system selects part of the data for which it has the most uncertainty and which has not yet been corrected by a human source.

Fifth, the human source corrects the selected data from the fourth step. The process then repeats steps two through five until the iterations converge to an outcome.

Convergence may be evidenced by a difference in results between consecutive iterations being less than a configurable threshold, and/or the number of corrections in the most recent iteration being less than a configurable threshold, and/or machine-corrected results being within a configurable threshold of human source-corrected results.

Convergence may be viewed as the system having a small uncertainty in its labels when it is correct, and a great uncertainty when it is wrong. A converged system rarely should have a great uncertainty. It should not have a small uncertainty on errors.

The automated processing phase of the second use case may run indefinitely, unless significant data having a level of uncertainty in its annotations greater than a predetermined threshold is detected. If such a level of uncertainty is detected, a warning that further tuning is needed, e.g., by returning to the tuning phase may be provided.

At this point, after processing the first part of the corpus of data, the remaining parts of the corpus of data are expected to have a relatively large amount of uncertainty with respect to accuracy of the de-identification.

The tuning phase may be executed again (i.e., a retuning) using the parts of data having a relatively large amount of uncertainty. In this case, the retuning should be able to be performed quickly since it is just an update of the previous tuning. When the retuning is completed, the process may return to the automated processing phase.

A process to perform the automated processing phase may include the following steps.

First, process the clinical report documents (see above).

Second, if there are a relatively large number of annotations having a high level of uncertainty, save the corpus of date (or portion thereof) that needs additional tuning into a designated storage location (e.g., as one or more files in a "needs tuning" directory).

Third, if the designated storage location from the second step becomes overly full (e.g., as determined by percentage utilization of available storage capacity being greater than a settable threshold), or if a single clinical report document or data part has a very large uncertainty, e.g., by performing a sub-process having the following sub-steps:

The first sub step is to warn that tuning is needed.

The second sub step is to respond via a control tuning interface, such that data to be tuned is selected from the designated storage location.

A drawback of the first use case is that the automated system selects part(s) of the clinical report document for a review by a human source. To select parts, the whole document should be read. Because people find it easier to read documents linearly, i.e., in a literary order, instead of as fragmented chunks or sentences that may be out of sequence with other fragmented sentences. Thus, the part to review must be a coherent document unit.

Third Use Case

In contrast, in a third use case an enhancement to the first use case is provided by having an automated system identify annotations having a relatively high level of uncertainty, and highlight those annotations with human-perceptible markings, (e.g., one or more of: a highlighting color for text or background; bold font; italic font; point size of font; underlining; enclosing an annotation in a box, circle, ellipse or the like; separation with whitespace; inclusion of starting and/or ending markers such as arrows or asterisks; time-varying or interactive effects such as blinking text or a text crawl on a dynamic display; and so forth).

The process described with respect to the first use case is repeated, however, it is improved by providing a custom user interface that allows for recognition and/or differentiation of areas and annotations of small and great uncertainty.

In accordance with an embodiment of the present invention the third use case is implemented using the following steps:

Initially, a corpus to be de-identified already is divided into a plurality of chunks of data. The process begins, first, with a human source annotating PHI in the first chunks of data. The human source annotation is likely to be imperfect, and include missed PHI.

Second, the process may learn from previously corrected data to modify its detection process (e.g., filters, neural networks, etc.) in order to improve the detection and de-identification accuracy.

Third, the process may annotate new data more correctly by usage of the modified detection processes.

Fourth, the process may select part of the data for which it has great uncertainty and which has not been corrected by a human yet.

Fifth, the process will highlight those portions of the annotations or sections of text that have a relatively large amount of uncertainty in the accuracy or completeness of the de-identification.

Sixth, the machine-corrected annotations or text from the fifth step is presented to a human source for review, and correction if necessary. Steps two through six may be repeated until the iterations converge to an outcome.

Sampling

Given that modern Electronic medical record (EMR) systems manage data on millions of patients, it is critical to develop de-identification routines for such data in a manner that are both effective and efficient. This, however, can be excessively costly, thus, incorporating an active learning in the process may reduce the overall cost for annotation and, thus, support the establishment of a more scalable de-identification pipeline. Active learning works by allowing the machine learning system to select the data to be annotated by a human oracle and added to the set of training data iteratively. Accordingly, with machine learning based de-identification systems actively requesting more informative data that helps to create a better PHI de-identification model from human source annotators, less training data will be needed in the machine learning process to maintain (or even improve) the performance of trained PHI de-identification models for de-identification.

The system of the present invention introduces query strategies based on (1) uncertainty sampling and the notion of (2) return on investment for de-identification, as these approaches are more practical.

Active learning has been shown, e.g., Y. Chen, T. A. Lasko, Q. Mei, J. C. Denny and H. Xu, "A study of active learning methods for named entity recognition in clinical text," *Journal of biomedical informatics*, vol. 58, pp. 11-18, 2015. ("Reference 1") to be an effective tool in named entity recognition tasks in clinical text. Reference 1 simulated several selection strategies including both uncertainty and diversity sampling. This suggests that active learning is more efficient than passive learning in most cases. This further suggested that uncertainty sampling was the best strategy for reducing the annotation cost. The results implied that human annotation cost should be taken into account when evaluating the performance of active learning.

In the context of de-identification, H. Boström and H. Dalianis, "De-identifying health records by means of active learning," *Recall (micro)*, vol. 97, no. 97.55, pp. 90-97, 2012. ("Reference 2"), proposed an active learning approach that relied upon a random forest classifier. Reference 2 evaluated the approach with a dataset of 100 Swedish EMRs. In their framework, the query strategy to determine which documents humans should annotate next focused on entropy-based uncertainty sampling. However, this investigation was limited in several notable ways. First, entropy-based uncertainty sampling does not explicitly account for the human annotation cost, such that several query strategies are introduced and implemented. Second, an expanded investigation is performed and controlled experiments are conducted using real, as well as a publicly accessible resynthesized, EMR data.

Recently, A. Fong, J. L. Howe, K. T. Adams and R. M. Ratwani, "Using active learning to identify health information technology related patient safety events," *Applied clinical informatics*, vol. 8, no. 1, p. 35, 2017. ("Reference 3") developed an active learning workflow for Patient Safety Events (PSE) identification with support vector machine (SVM) and showed that active learning helped in identifying health information technology (HIT) related events.

Figure 3:
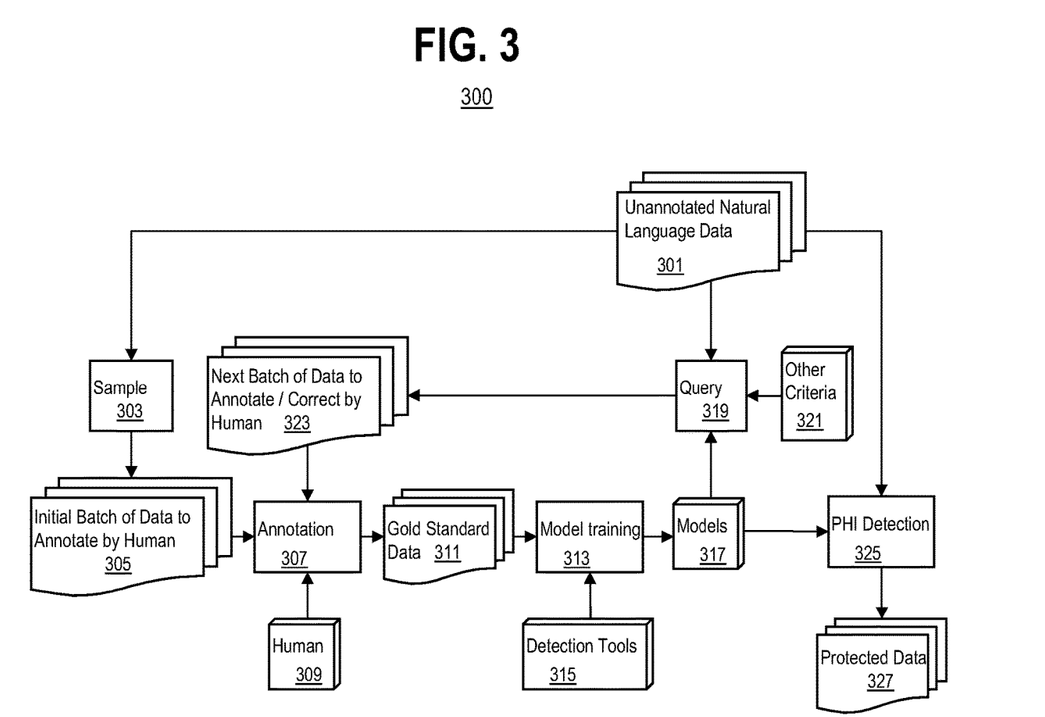
FIG. 3 is a functional block diagram of an active learning system for Personally Identifiable Information detection in accordance with a preferred embodiment of the present invention.

For the system of the present invention a pool-based active learning framework of Reference 1 is relied on. This means that there is a limited amount of annotated data and a large pool of unannotated data available for selection. The pipeline for the active learning framework for natural language de-identification is illustrated in FIG. 3. The active learning framework carries out learning to detect PHI in order to de-identify documents stored in unannotated natural language data 301. As will be described, the active learning framework is iterative.

As the starting point of the active learning, a small initial chunk of data is selected randomly at step 305 from the dataset sampled at step 303 from the unannotated natural language data 301. Then, at step 307, human source annotators 309 manually tag the PHI in the initial chunk of data to create a gold standard dataset 311 for PHI de-identification model training. The editing or annotating may be accomplished using software products, e.g., word processors, known to these skilled in the art. Similarly, the chunk of data and other portions of the sampled dataset may display on a computer display 230 (FIG. 2).

Since human annotation is costly, the goal of active learning is to reduce the total amount of human annotation needed in the process while maintaining (or even improving) the performance of PHI de-identification model training. In reality, the human sources' effort involved in the framework can be viewed as two parts:

1) the human source's annotation effort in gold standard creation, and
2) the human correction effort that is needed to fix incorrect labels generated in the previous round when the PHI de-identification model is applied to unannotated data (because no reasonable existing automatic de-identification approaches yield a recall of 100%).

After the first batch of gold standard data 311 is created by human source annotators, a PHI de-identification model is trained at step 313 to create PHI de-identification models 317. Once the PHI de-identification model 317 meets a predetermined quality standard, it will be applied to the remainder of the unannotated data to detect PHI at step 325.

At step 319, the active learning pipeline of FIG. 3 queries for or requests more informative data, i.e., next chunk of data 323 to be corrected by human sources 309 based on quality of previously trained PHI de-identification models 317 and/or additional criteria 321. This information is expected to assist in better PHI de-identification model development.

Another way to view this strategy is, instead of randomly selecting a fixed amount of unannotated data for training data (passive learning), the system actively queries for the data that potentially contributes more information in PHI de-identification model training.

Since the query for active learning is based on a heuristic, several query strategies for the active learning de-identification framework are developed and their performances compared with a simulation. First, a problem is formulated as follows:

Let D be a set of documents, $D_L$ and $D_U$ be the set of annotated and unannotated documents, where $D = D_L \cup D_U$. $D_U$ consists of n documents, $d_1, d_2, \ldots, d_n$.

Let $Q(d_i)$ be the query strategy that the active learning framework utilizes to select additional documents for human source annotation.

The goal of the query step is to choose the data $d_c$ that maximizes $Q(d_i)$, $d_c = \arg \max_{d_i \in D_U} (Q(d_i))$.

Let $D_S$ be the selected batch of k documents for a human source to annotate, in essence, this consists of the k documents that maximize $Q(d_i)$.

Note that the value of k could depend on the learning rate of the framework, as well as the time that it takes to retrain and re-annotate.

Once $D_S$ has been corrected by the human source, it is removed from the unannotated document set $D_U$, while $D_L$ is updated to include the annotated batch of documents: $D_L' = D_L \cup D_S$, $D_U' = D_U \backslash D_S$.

Each time $D_S$ is annotated and added to training, the PHI de-identification model needs to be retrained using $D_L'$.

Additionally, the unannotated documents will become part of the annotated set, based on the updated PHI de-identification model.

Uncertainty Sampling

One of the more prevalent query strategies for active learning is uncertainty sampling (Reference 1). In this model, it is assumed that the active learning system picks the data that the current model is most uncertain of when making predictions.

Least Confidence (LC)

For a Conditional Random Fields (CRF) model, given token x, let y be the most likely predicted label of x (e.g., a patient's name or a date) and let P(y|x) be the posterior probability. Then P(y|x) is the confidence score of x given the current model. Next, the uncertainty of token x, is defined as 1−P(y|x). Note that, the aim is to find the document for which the current model has the least confidence. Upon doing so, either the summation of the LC-based uncertainty of all tokens in a document $d_i$:

$$UC(d_i) = \sum_t (1 - P(y_t \mid x_t)) \tag{7}$$

is used or the mean of all token uncertainty based on LC:

$$UC(d_i) = \frac{\sum_t (1 - P(y_t \mid x_t))}{l_i} \tag{8}$$

where $l_i$ is the total number of tokens in $d_i$.

The problem with adopting the mean of all token uncertainty is that it neglects the length of the documents in the selection process, which may not be optimal. One of the initial findings of employing the sum of token uncertainty approach is that the predicted non-PHI tokens are more likely to produce a prediction confidence score of 0.95 or higher, while the confidence of the tokens that are predicted as PHI are, in most cases, lower. Also, since the selection aims for documents with a higher sum of token uncertainty, it tends to be biased towards documents that contain a larger amount of tokens, even though the PHI density in the selected set of documents could be low (which is not desirable for model training).

For a simple illustration, consider the following two documents $d_1$ and $d_2$, the information of the two documents is summarized in Table 1.

TABLE 1

An example of how the number of tokens and PHI density influence the sum of token uncertainty of documents.

| Statistic | Document $d_1$ | Document $d_2$ |
|---|---|---|
| Total number of non-PHI token | 1000 | 100 |
| Average non-PHI token confidence | 0.99 | 0.99 |
| Total number of PHI token | 5 | 10 |
| Average PHI token confidence | 0.6 | 0.6 |
| PHI density | 0.5% | 9.1% |
| Sum of token uncertainty | 12 | 5 |

Note that, document $d_2$ consists of a much higher PHI density than document $d_1$ and might provide more information in PHI de-identification model training. Nonetheless, uncertainty sampling will more likely choose document $d_1$ over document $d_2$ due to a higher sum of token uncertainty.

To mitigate this problem, a modified version of the least confidence approach, referred to as least confidence with upper bound (LCUB), is introduced. In this variation, instead of summing the uncertainty of all tokens, the framework calculates the sum of uncertainty of tokens, when $P(y_t|x_t)<\theta$, where $\theta$ is a cutoff value for uncertainty sampling. Let $\Sigma f(x_t, \theta)$ be the modified sum of token uncertainty with cutoff value $\theta$:

$$f(x_t, \theta) = \begin{cases} (1 - P(y_t | x_t)), & P(y_t | x_t) < \theta \\ 0, & P(y_t | x_t) \geq \theta \end{cases} \quad (9)$$

Entropy

Entropy measures the potential amount of discriminative information available. Given a token x, its entropy H(x) is computed as:

$$H(x) = -\sum_{j}^{m} P(y_j | x) \log P(y_j | x) \quad (10)$$

where m corresponds to the number of most probable labels of x, as predicted by the current classification model (e.g., the CRF). Here $P(y_j|x)$ is the probability that x's label is $y_j$.

Again, for a document $d_i$ that contains t tokens, the total entropy-based uncertainty of $d_i$ can be calculated as:

$$UC(d_i) = -\sum_t \sum_j P(y_{tj} | x_t) \log P(y_{tj} | x_t) \quad (11)$$

Similar to the LC approach, entropy-based uncertainty also tends to suffer from the problem of low PHI density documents. To mitigate this issue, an entropy with lower bound (ELB) approach is introduced. In this approach, a minimum threshold $\rho$ is set for token entropy. Thus, let $\Sigma g(x_t, \rho)$ be the modified sum of token entropy with minimum value $\rho$:

$$g(x_t, \rho) = \begin{cases} H(x_t), & H(x_t) > \rho \\ 0, & H(x_t) \leq \rho \end{cases} \quad (12)$$

Return on Investment

The goal of active learning is to reduce the human effort needed in the machine learning process. Both the least confidence and the entropy-based uncertainty sampling methods seek to solve the problem by minimizing the training data required. However, this implicitly assumes that the cost for human source annotation is fixed and is not explicitly modeled during the query step 319 (FIG. 3). In reality, there is a need to acknowledge that the effort that a human annotator spends is more complex than the above assumption. Consider, it is likely that the cost varies based on PHI types, error types, human fatigue (due to the number, or length, of documents), among other factors. Additionally, the contribution of human correction towards a better model can also vary according to various factors, such as PHI types and error types. Thus, a query strategy that accounts for both the cost and the contribution of human correction is designed.

Assuming that there is a reading cost for the human annotator that is proportional to the length of the document that is being annotated. The average reading cost per token is denoted by $ct_r$, which implies that the total reading cost for a document $d_i$ of length $l_i$ is $ct_r \times l_i$.

Again, to start formalizing the problem considering the given token x. Let y be the most likely label of x. $P(y|x)$ is the probability that the active learning system assigns y as the label of x, while $P'(y|x)$ is the true probability that x is of class y.

Without loss of generality, here, only a two-class of the problem, PHI versus non-PHI is considered. This indicates an assumption that the annotation cost and the human contribution of correcting a PHI instance classified as the wrong PHI type cancel each other out. Let $ct_n$ and $ct_p$ be the human correction cost of correcting a false negative (FN) instance (i.e., a token mistakenly labeled by the learned model as non-PHI) and a false positive (FP) instance (i.e., a non-PHI token mistakenly labeled by the current model as PHI), respectively. Similarly, $cn_n$ and $cn_p$ represent the human correction contribution of correcting an FN instance and correcting an FP instance, respectively.

Thus, the expected total contribution of human correction for token x when y is a nonPH1 instance can be defined as TCCN(x) and calculated as:

$$TCCN(x) = cn_n \times P(y|x) \times (1-P'(y|x)) + cn_p \times (1-P(y|x)) \times P'(y|x) \quad (13)$$

The expected total cost of human correction for token x when y is a non-PHI instance is represented by TCCT(x), then $$TCCT(x) = ct_n \times P(y|x) \times (1-P'(y|x)) + ct_p \times (1-P(y|x)) \times P'(y|x) \quad (14)$$

Then, there is the expected return on investment (ROI) of token x labeled as non-PHI:

$$ROI(x) = (cn_n - ct_n) \times P(y|x) \times (1-P'(y|x)) + (cn_p - ct_p) \times (1-P(y|x)) \times P'(y|x) - ct_r \quad (15)$$

Similarly, the expected ROI of token x labeled as PHI:

$$ROI(x) = (cn_p - ct_p) \times P(y|x) \times (1 - P'(y|x)) + (cn_n - ct_n) \times (1 - P(y|x)) \times P'(y|x) - ct_r \quad (16)$$

Note that $cn_n - ct_n$ and $cn_p - ct_p$ represent the net contribution of correcting an FN instance and an FP instance, respectively. At this point, let $NC_n$ and $NC_p$ denote the net contribution of an FN instance correction and an FP instance correction, respectively. Thus, $$ROI(x) = \begin{cases} NC_n \times P(y|x) \times (1 - P'(y|x)) + \\ NC_p \times (1 - P(y|x)) \times P'(y|x) - ct_r, \ y \text{ is non-PHI} \\ NC_p \times P(y|x) \times (1 - P'(y|x)) + \\ NC_n \times (1 - P(y|x)) \times (1 - P'(y|x)) - ct_r, \ y \text{ is PHI} \end{cases} \quad (17)$$

Consequently, the total expected ROI of unannotated document $d_i$ is:

$$ROI(d_i) = \sum_t ROI(x_t) \quad (18)$$

Finally, it is desirable that the active learning pipeline picks documents that could maximize ROI.

A converging state represents a situation for which embodiments still are constantly improving, through an iterative process of automatic annotation, human source correction, learning from the human source correction, and repeating until a metric of annotation quality meets or exceeds a predetermined threshold.

A steady state represents a situation for which the system is sufficiently near to human source performance as is necessary, given resource limitations (e.g., computing time and/or cost) or user-defined criteria (e.g., a minimum accuracy rate). A system in steady state is said to be converged. A system in steady state typically performs only automatic annotation, minimal or cursory human source review/correction, verification of adequate performance, and repeating for the next data part if performance is adequate. If the performance is not adequate (e.g., accuracy is too low), which may be a result of a change in a characteristic of the corpus of data being de-identified (e.g., a different type of data, different formatting of the data, etc.), the system may transition from the steady state to the startup and/or converging state.

Embodiments in accordance with the present disclosure provide various improvements over the background art. In particular, some systems of the background art involve a human tuning an automatic detection system up front, followed by manual and/or human review and correction of data the systems processed incorrectly.

Embodiments in accordance with the present disclosure may include a baseline (i.e., default or "out of the box") tuning process, which initially may not have the benefit of training or annotating to a specific corpus of data. However, as a user annotates PHI in a document or part of a document, or makes corrections to a machine-generated annotation, embodiments learn and improve. Experiments and tests have demonstrated that after embodiments learns from about 100 pages of human-annotated data (out of perhaps hundreds or thousands of pages in the corpus of data), the embodiments tend to reach or exceed the performance of background art automatic system.

We claim:

1. A computing machine implemented method, comprising:
   identifying one or more data sets by comparing each of the one or more data sets to a quality threshold;
   creating a training data set from the identified one or more data sets;
   training a machine learning (ML) model using the training data set based on labeled features in a first portion of a textual document;
   determining a measure of uncertainty regarding accuracy of the labeling, for other portions of the textual document;
   selecting a second portion of the textual document for labeling based on the respective measures of uncertainty and based on a determination that the second portion of the textual document contributes to further training of the ML model and accounts for a variable cost and contribution of labeling by an authoritative source;
   labeling features of the second portion of the textual document using the ML model;
   comparing the features of the second portion labeled by the ML model to the features of the second portion labeled by the authoritative source;
   further training the ML model based on the comparison.

2. The method of claim 1, further comprising:
   repeating the selecting, the labeling, the comparing, and the further training until the measure of feedback crosses a threshold.

3. The method of claim 1, further comprising randomly selecting the first portion of the textual document for annotation.

4. The method of claim 1, further comprising:
   optimizing a size of the second portion of the textual document.

5. The method of claim 4, wherein the optimizing comprises:
   selecting an amount of text to include with the second portion of the textual document based on a training/learning rate of the ML model.

6. The method of claim 1, wherein the determining comprises:
   determining the measure of uncertainty based on at least one of uncertainty sampling, least confidence, entropy, and return on investment.

7. The method of claim 6, wherein when the determining further comprises:
   determining the measure of uncertainty based on uncertainty sampling.

8. The method of claim 1, wherein when the determining comprises:
   determining the measure of uncertainty based on a density of labels within the respective one or more other portions of the textual document.

9. The method of claim 1, further comprising:
   issuing a warning based on the determination of the measure of uncertainty.

10. The method of claim 1, wherein the ML model identifies whether the measured uncertainty exceeds a predetermined threshold.

11. The method of claim 1, wherein a query-by-committee is used to train the ML model.

12. The method of claim 1, wherein the training of the ML model includes selecting a dataset causing an amount of disagreement among the one or more datasets to train the ML model.

13. The method of claim 1, wherein the measure of uncertainty is determined by measuring a confidence level in the labeling.

14. The method of claim 1, wherein the measure of uncertainty is determined by measuring whether a level of corrections with regard to annotations of the labeling is greater than a predetermined threshold.

15. The method of claim 1, wherein the determination that the second portion of the textual document contributes to further training of the ML model accounts for potential error of the authoritative source.

16. The method of claim 15, wherein the potential error of the authoritative source is determined based on one or more of a type of information within the second portion of the textual document and a potential error type.

17. A system, comprising:
a processor configured to:
identify one or more data sets by comparing each of the one or more data sets to a quality threshold;
create training data set from the identified one or more data sets;
train a machine learning (ML) model using the training data set based on labeled features in a first portion of a textual document;
determine a measure of uncertainty regarding accuracy of the labeling, for other portions of the textual document;
select a second portion of the textual document for labeling based on the respective measures of uncertainty and based on a determination that the second portion of the textual document contributes to further training of the ML model and accounts for a variable cost and contribution of labeling by an authoritative source;
label features of the second portion of the textual document using the ML model;
compare the features of the second portion labeled by the ML model to the features of the second portion labeled by the authoritative source; and
further train the ML model based on the comparison.

18. The system of claim 17, wherein the processor is further configured to repeat the selecting, the labeling, the comparing, and the further training until the measure of feedback crosses a threshold.

19. The system of claim 17, wherein the processor is further configured to determine the measure of uncertainty based on at least one of uncertainty sampling, least confidence, entropy, and return on investment.

20. The system of claim 17, wherein the processor is further configured to optimize a size of the second portion of the textual document.

21. The system of claim 20, wherein the processor is further configured to select an amount of text to include with the second portion of the textual document based on a training/learning rate of the ML model.

22. A non-transitory computer readable medium encoded with a computer program that comprise instructions to cause a processor to:
identify one or more data sets by comparing each of the one or more data sets to a quality threshold;
create training data set from the identified one or more data sets;
train a machine learning (ML) model using the training data set based on labeled features in a first portion of a textual document;
determine a measure of uncertainty regarding accuracy of the labeling, for other portions of the textual document;
select a second portion of the textual document for labeling based on the respective measures of uncertainty and based on a determination that the second portion of the textual document contributes to further training of the ML model and accounts for a variable cost and contribution of labeling by an authoritative source;
label features of the second portion of the textual document using the ML model;
comparing the features of the second portion labeled by the ML model to the features of the second portion labeled by the authoritative source; and
further train the ML model based on the comparison.

23. The non-transitory computer readable medium of claim 22,
further comprising instructions to cause the processor to:
determine the measure of uncertainty based on at least one of uncertainty sampling, least confidence, entropy, and return on investment.

* * * * *